United States Patent
Dax

(10) Patent No.: US 9,221,628 B2
(45) Date of Patent: Dec. 29, 2015

(54) DEVICE AND METHOD FOR COMPOSING TWO-DIMENSIONAL PRODUCTS, IN PARTICULAR PRINTED PRODUCTS

(71) Applicant: FERAG AG, Hinwil (CH)

(72) Inventor: Roman Dax, Baretswil (CH)

(73) Assignee: FERG AG, Hinwil (CH)

( * ) Notice: Subject to any disclaimer, the term of this patent is extended or adjusted under 35 U.S.C. 154(b) by 66 days.

(21) Appl. No.: 13/690,072

(22) Filed: Nov. 30, 2012

(65) Prior Publication Data

US 2013/0149096 A1 Jun. 13, 2013

(30) Foreign Application Priority Data

Dec. 7, 2011 (CH) ........................................ 1942/11

(51) Int. Cl.
*B65G 57/00* (2006.01)
*B65H 29/00* (2006.01)
(Continued)

(52) U.S. Cl.
CPC ............... *B65G 57/00* (2013.01); *B65H 29/00* (2013.01); *B65H 33/16* (2013.01); *B65H 39/00* (2013.01); *B65H 2301/21* (2013.01); *B65H 2511/10* (2013.01); *B65H 2511/12* (2013.01); *B65H 2511/20* (2013.01)

(58) Field of Classification Search
CPC ............ B65H 31/34; B65H 2511/11–2511/12; B65H 29/24; B65H 29/22; B65H 29/125; B65H 31/20; B65H 33/02; B65H 43/02; B65H 29/00; B65H 33/16; B65G 57/005; B65G 57/00
USPC ................ 414/788.9, 802, 790.9, 791, 792.7, 414/792.8, 793.8, 793.9, 795.7, 796.7
See application file for complete search history.

(56) References Cited

U.S. PATENT DOCUMENTS

| 3,548,995 | A | * | 12/1970 | Wiseman et al. | .......... 414/790.4 |
| 3,643,816 | A | * | 2/1972 | Jacobsen | .................... 414/788.9 |
| 3,905,487 | A | * | 9/1975 | Hoke et al. | ................. 414/789.1 |

(Continued)

FOREIGN PATENT DOCUMENTS

| CH | 703953 | 4/2012 |
| DE | 4431669 | 3/1996 |

(Continued)

OTHER PUBLICATIONS

Search report issued by the Swiss Federal Institute of Intellectual Property.

(Continued)

*Primary Examiner* — Saul Rodriguez
*Assistant Examiner* — Lynn Schwenning
(74) *Attorney, Agent, or Firm* — Rankin, Hill & Clark LLP

(57) ABSTRACT

A device for manufacturing stacks of product units, in particular of printed products is provided. The device includes a stacking device with a plurality of support units which in each case form a support surface for the stacks to be formed, furthermore a circulatory arrangement, in which the support units, arranged one after the other along a closed circulatory path, can be moved into and out of a stacking region. The support units moreover in each case include at least two support elements which are arranged next to one another. The stacking device includes a device for setting the distance between the lateral outer edges of the support units with a continued conveying operation.

15 Claims, 8 Drawing Sheets

(51) Int. Cl.
*B65H 33/16* (2006.01)
*B65H 39/00* (2006.01)

(56) References Cited

U.S. PATENT DOCUMENTS

| | | |
|---|---|---|
| 4,168,828 A | 9/1979 | McLear |
| 5,006,041 A * | 4/1991 | Sjogren ................ 414/790.4 |
| 5,024,569 A * | 6/1991 | Watts et al. ............ 414/790.3 |
| 5,221,177 A * | 6/1993 | Messerly et al. ........ 414/788.9 |
| 5,433,582 A * | 7/1995 | Medina ................. 414/788.3 |
| 5,638,659 A | 6/1997 | Moncrief et al. |
| 5,772,391 A * | 6/1998 | Sjogren et al. .......... 414/790.9 |
| 5,954,473 A * | 9/1999 | Folsom ................. 414/788.9 |
| 6,293,543 B1 * | 9/2001 | Lawrence ................. 271/213 |
| 6,527,501 B2 * | 3/2003 | Wolf ....................... 414/789 |
| 6,966,743 B2 * | 11/2005 | Eugster ................. 414/790.3 |
| 7,673,743 B2 * | 3/2010 | Ruff et al. .............. 198/861.4 |
| 7,871,070 B2 * | 1/2011 | Ruff et al. ................ 271/218 |
| 8,529,186 B2 * | 9/2013 | Klein ..................... 414/789.1 |
| 2002/0101031 A1 | 8/2002 | Dittli et al. |
| 2006/0042759 A1 | 3/2006 | Honegger |
| 2009/0139839 A1 | 6/2009 | Ong |
| 2009/0289411 A1 * | 11/2009 | Dax ....................... 271/189 |
| 2011/0291354 A1 | 12/2011 | Herrmann et al. |
| 2012/0274018 A1 | 11/2012 | Heinz |

FOREIGN PATENT DOCUMENTS

| | | |
|---|---|---|
| EP | 0622319 | 11/1994 |
| EP | 0640547 | 3/1995 |
| EP | 0899229 A2 | 3/1999 |
| EP | 2138439 | 12/2009 |
| EP | 2181953 | 5/2010 |
| EP | 2505536 | 10/2012 |
| JP | 62-100358 | 5/1987 |

OTHER PUBLICATIONS

European Search Report, EP 12 40 5123, dated Apr. 5, 2013, 6 pages.
Swiss Search Report, CH 01942/11, 3 pages.

* cited by examiner

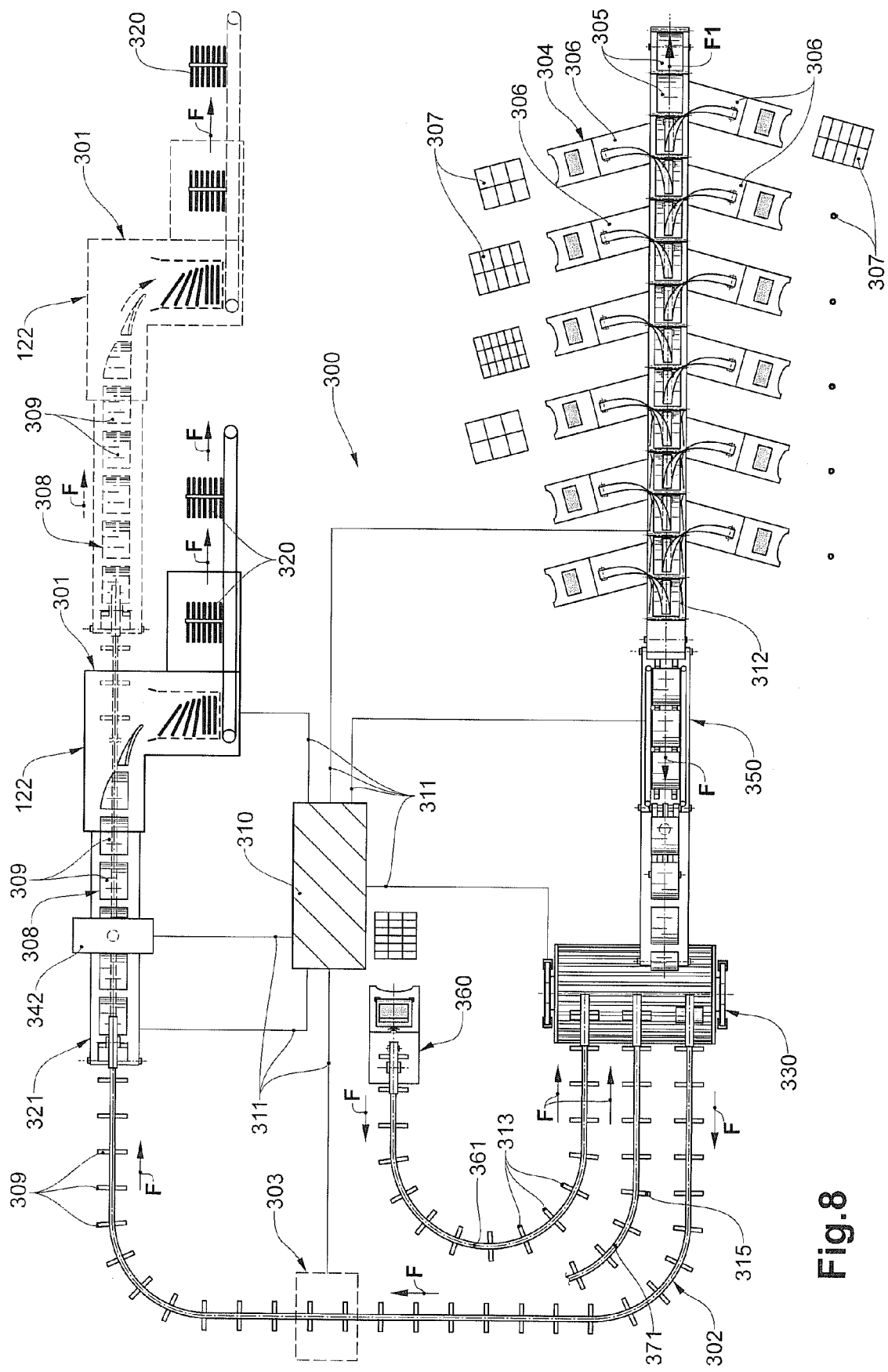

DEVICE AND METHOD FOR COMPOSING TWO-DIMENSIONAL PRODUCTS, IN PARTICULAR PRINTED PRODUCTS

BACKGROUND OF THE INVENTION

1. Field of the Invention

The invention relates to the field of conveying technology and in particular relates to a device for manufacturing compositions of product units, in particular of printed products or containing these. Moreover, the invention relates to a processing installation and to a method for operating a processing installation.

2. Description of Related Art

EP 2 138 439 A2 describes a device for manufacturing stacks of two-dimensional printed products. The device comprises a stacking device with a stacking shaft comprising a main stacking shaft as well as with a preliminary stacking shaft arranged above the main stacking shaft. The stacking device moreover comprises a circulatory arrangement with support units which can be moved into the preliminary stacking shaft and out of this. The support units form a support surface for a product stack to be formed in the preliminary stacking shaft. The product units to be stacked are fed to the preliminary stack via a feed device. The product units on the support units in the preliminary stack shaft form a preliminary stack, whilst a further support unit located therebelow releases a preliminary stack which prior to this was formed thereon, to the main stacking shaft for forming a main stack. The support units are movably arranged one after the other in the circulatory arrangement, along a closed circulatory path. Each support unit comprises a pairing in each case of two support elements arranged next to one another.

U.S. Pat. No. 5,772,391 likewise describes a device for manufacturing stacks from two-dimensional printed products. The device comprises a stacking device with a stacking shaft. The stacking device moreover comprises support units which engage into the stack shaft and form a support surface for the product stack to be formed. The product units to be stacked are fed to the stack shaft via a feed device. The product units are led together on the support units engaging into the stack shaft, into a stack. A further support unit which is located therebelow transfers a stack which is previously formed thereon, to a receiver unit in the stack shaft. Here too, the stacking device comprises a circulatory arrangement, in which the support units, arranged one after the other along a closed circulatory path, can be moved into and out of the stacking shaft. Each support unit likewise has a pairing of support elements arranged next to one another.

BRIEF SUMMARY OF THE INVENTION

Devices of the type described above must nowadays be designed for the processing of product units with different dimensions, in particular [two-dimensional] size formats. In particular, the distance between lateral limitation elements as well as the distance between the lateral outer edges of the support elements or support units must in each case be directed to the width of the product units, so that the latter can be supported optimally from below during the stack formation procedure. I.e. the support over the width of the product units should not turn out to be too wide or too narrow.

A change of the dimension or size format however often entails the shutting-down of the installation and a manual setting (adjusting) of component arrangements in processing devices, to the changed product dimension.

For reasons of productivity however, a format change between the individual product streams should be accomplished where possible without delay or even without an interruption of the processing operation.

It is therefore the object of the present invention, to further develop the device and the associated method, to the extent that a resetting of the component arrangement to a changed product dimension can be carried out as quickly as possible and without any delay of the working process.

Further preferred embodiments and further developments of the invention are to be deduced from the dependent patent claims. Features of the method claims in this context can be combined with features of the device claims and vice versa.

The invention thus relates to a device for manufacturing compositions, in particular stacks, of product units, in particular from or with printed products. The device comprises at least one adjustment means for adapting at least one component arrangement of the device to the changed dimension of product units fed to the device one after the other. The component arrangement thereby in particular serves for aligning the product units in the device. This is effected preferably with a continued and in particular gapless conveying operation.

Compositions of product units are to be understood as a plurality of product units which in an ordered manner and perpendicularly or obliquely next to one another and/or lying above one another in a horizontal or inclined manner, are brought together into a group or a lot. With regard to a composition of product units lying horizontally or obliquely, one also speaks of a stack.

Gapless means that no products gap which is larger than the distances between the products in the product streams and which is envisaged for the purpose of format resetting, is present between two consecutive streams of product units with different product characteristics. With a cycled product stream, a gap is formed for example by way of one or more consecutive conveying cycles having no product units.

Thus the device for composing product units, according to a further development of the invention can be a collating device for collating stacks of product units for example, in particular individual printed products, into collections or collations.

The collating device is characterised by a conveying means with a plurality of conveying compartments which can be displaced one after the other, along an in particular closed conveying path.

Product units are fed to the conveying compartments via feed units, for the purpose of creating the compositions. The conveying compartments for this comprise a support surface, on which the product units fed from the feed units are deposited and are composed into a collection. If the support surface is horizontal or inclined, e.g. inclined up to an angle of 45° (angle degrees), then the composition corresponds e.g. to a stack. The conveying compartments in this case form a stack region in each case.

Moreover, an adjustment means in the form of a side aligning unit with side aligning means arranged on both sides of the conveying compartments, for the lateral alignment of the products deposited on the conveying compartments, can be assigned to the collating device.

According to another further development of the invention, the device relates to the manufacture of stacks of product units. The device for this comprises a stacking device with at least one support unit which forms a support surface for the stacks to be formed. The stacking device for this comprises a circulatory arrangement, in which the at least one support unit along a closed circulatory path can be can be moved, in particular pivoted, into the a stack region from above, and can be moved, in particular pivoted, out of the stack region again, in a lower region.

The support unit comprises preferably at least one, and in particular exactly two support elements arranged next to one another. The support element or elements can be designed e.g. in the form of panels or prongs.

The device however preferably comprises a plurality of the described support units which are arranged one after the other along a closed circulatory path in the circulatory arrangement and, as described above, are movable into a stack region and out of a stacking region.

According to a first preferred variant of the mentioned further development, the stacking device comprises a side limitation device with a first and a second lateral stack limitation element, as well as adjustment means for setting the distance between the lateral side limitation elements, in particular with a continued conveying operation.

The mentioned adjustment means e.g. comprise a screw mechanism with at least one threaded spindle which is driven by a drive means, such as a drive motor and which engages into a mating-thread body connected to a lateral stack limitation element. The drive motor which is preferably an electric motor can drive the threaded spindle in a direct manner, or indirectly via a gear.

According to a particular embodiment of the screw mechanism mentioned above, the mentioned adjustment means comprises a driven threaded spindle with two oppositely running threaded sections. In each case, a mating thread body is arranged on the two threaded sections, wherein a first mating thread body is connected to the first stack limitation element, and a second mating thread body is connected to the second stack limitation element.

According to a second preferred variant of the mentioned further development, the stacking device alternatingly or additionally to the first variant comprises (further) adjustment means for setting the distance between the lateral outer edges of the support units, in particular with continuous conveying operation.

If the support unit comprises two support elements arranged next to one another or in an overlapping manner, then the distance between the lateral outer edges of the support elements can be adjusted with the adjustment means, by way of the support elements being moved laterally relative to one another by the adjustment means. For this, only one or all support elements can be laterally moved.

A product unit preferably consists of an individual product or of several products, in particular two-dimensional products which are layered, in particular stacked or inserted into one another. The two-dimensional products of a product unit can have identical or different dimensions, in particular size formats. The size format relates to the two-dimensional extension of the product unit which e.g. is specified as the length and width or depth or in the form of a diameter. The dimension is related to the size format and the thickness or height of the product unit.

The products or individual products of a product unit are preferably printed products. The product unit as such is preferably likewise designed in a two-dimensional manner. The product or products of a product unit can moreover be partly or completely surrounded by a packaging wrapper.

A product unit can in particular be a collection of different products of a different dimension or of different formats, wherein the dimension of the collection is defined by a maximal width, a maximal depth and a maximal height. The dimension of the collection can e.g. be computed e.g. from the dimensions of the individual products and/or by way of measuring the dimension of the collection.

The stacking region of the stacking device is preferably formed by a stacking shaft, wherein the support units, as mentioned, can be moved into and out of the stacking shaft. The stacking shaft defines an essentially vertically running stacking space, in which the product units are collated into stacks in the direction of gravity. The stacking shaft can be physically partly or completely delimited by way of laterally arranged device elements such as wall elements, stop bars, etc. The lateral stacking limitation elements of the side limitation device preferably form a lateral limitation of the stacking shaft.

Moreover, the device comprises a stack support which is arranged below the stacking shaft and which terminates the stacking shaft to the bottom, and to which the product stack formed on the support units are transferred for further processing by way of moving the support units out of the stacking shaft.

According to a preferred further development of the invention, the stacking shaft comprises a main stacking shaft for forming a main stack, as well as a preliminary stacking shaft which is arranged above the main stacking shaft and is for forming a preliminary stack or part-stack or intermediate stack. The support units can be moved into and out of the preliminary stacking shaft according to this further development.

The device moreover preferably comprises a feed device for feeding product units to be stacked, into a stacking region, in particular into the stacking shaft or the preliminary stacking shaft. The feed device can e.g. comprise a conveyor belt, on which the product units are fed in a singularised manner or in an imbricate stream, to the stacking shaft.

According to a preferred implementation of the concept of the invention, at least one support element and preferably two or all support elements of a support unit along their circulatory path are actively connected in each case to a positioning means acting on the support element transversely to the circulatory path, said active connection being of a nature such that the lateral position of the support element can be set via the positioning means. The position of the respective positioning means, for this, can be adjusted transversely to the circulatory path of the support units, via suitable adjustment means.

The support element and the positioning means assigned to this are usefully mechanically interactively connected for this. Here, laterally means transversely, in particular perpendicularly to a movement plane spanned by the movement direction of the support elements along their circulatory path.

In a preferred embodiment, the positioning means comprises a guide member which revolves in the movement direction of the support element and which acts as a lateral limitation means for a guide element arranged on the support unit and cooperating with the support element. The support units preferably run on the outer side along the guide member. The guide member preferably forms a circulatory contact edge, contact surface or contact line which is actively connected to the guide element. The guide element can e.g. be formed as a guide tab.

The positioning means preferably comprise two guide members which run parallel to one another and are coupled to one another, wherein the guide element is arranged between the guide members. The two guide members thus form a lateral limitation for the guide element on both sides.

On displacing the two guide members in a first lateral direction, a first guide member comes into mechanical contact with the guide element, for the purpose of displacing the support elements in the first lateral direction. On displacing the two guide members in a second lateral direction opposite to the first direction, the second guide member comes into mechanical contact with the guide element, for the purpose of displacing the support element in the second lateral direction.

In a preferred further development of the invention, at least one support element, preferably all support elements of a support unit are arranged or fastened on a transverse guide element via suitable holders. The support elements hereby are laterally displaceable but are preferably arranged in a rotationally secured manner, with respect to the transverse guide element. The at least one support element is then laterally displaceable along the transverse guide element via the positioning means assigned to this support element.

The support elements of a support unit can be arranged next to one another on a common transfer guide element or on separate transverse guide elements, e.g. ones running parallel to one another. The transverse guide element is preferably a longitudinal profile, on which the support element is displaceably held. The holder according to one possible embodiment comprises an opening, through which the longitudinal profile is arranged or held, in a guided and laterally displaceable manner. The cross section of the longitudinal profile, in the connection section, can correspond to the cross-sectional contour of the opening.

The longitudinal profile can for example be a round profile. The profile cross section however at least in the connection section is preferably not designed in a circular manner for creating a rotational securing. The longitudinal profile can e.g. be designed as a multiple-spline profile in sections or in a continuous manner.

The adjustment means for adjusting or setting the position of the positioning means preferably comprise a screw mechanism with a threaded spindle which is driven by a drive means and which engages into a mating thread body connected to the positioning means. A rotation movement introduced in to the threaded spindle by the drive member is converted into a relative displacement movement of the mating thread body with respect to the threaded spindle by way of this. The screw mechanism thus converts a rotating movement into a translatory movement.

The threaded spindle is mounted in a rotatable, but stationary manner. The drive member is preferably an electric motor. The drive can be effected directly or via a gear with e.g. drive belts.

The support units in each case comprise two support elements in a preferred embodiment of the invention. The circulatory arrangement comprises two positioning means which are arranged next to one another and which in each case cooperate with one of the support elements, for the lateral displacement of this. The adjustment means here also comprise a screw mechanism with a threaded spindle driven by a drive means.

The threaded spindle then along its longitudinal axis comprises two opposite threaded sections. A first threaded section engages into a first mating thread body connected to the first positioning means. A second threaded section engages into a second mating thread body connected to the second positioning means. The positioning means then with a rotation of the spindle move in opposite directions to one another or away from one another. In this manner, both positioning means and thus both support elements can be displaced laterally to one another in opposite directions via a common threaded spindle.

The support units can be driven e.g. in a slip-free manner via conveying means, in particular flexible conveying means such as chains or toothed belts, in the known way and manner, and be moved along their circulatory path. The conveying means can also comprise carriages led by rail, on which carriages a support unit is arranged in each case, wherein these carriages are moved in the circulatory direction with known drive members, such as guide rails. The support units for this are fastened on the conveying means via suitable fastening means. The fastening means can connect the support units to the conveying means e.g. via the transverse connection elements. The conveying means are led e.g. in an endless manner around deflection means, such as deflection rollers, deflection rolls or cogs. The deflection means can however be designed as drive means. Thus the conveying means can e.g. be driven via drive cogs or drive rollers.

The transverse connection elements on both sides at their lateral end sections preferably comprise guide members such as cam rollers which cooperate with a cam guide on the circulatory arrangement and via which the support units are led along their circulatory path.

Moreover, the transverse connection elements on both sides at their lateral end sections can comprise further guide members such as cam rollers which are fastened on a pivot lever and which cooperate with a further cam guide on the circulatory arrangement, for the control of the pivot position of the support elements along their circulatory path. The cam guides can form guide surfaces for the cam rollers.

The circulatory arrangement preferably comprises a carrying structure, in particular a machine mount, on which device components are fastened in a direct or indirect manner. The mentioned cam guides are e.g. preferably provided on lateral components of the carrying structure, such as e.g. side plates. The deflection means of the conveying means, the positioning means, and the associated adjustment means are further preferably directly or indirectly connected to the carrying structure. The deflection means are preferably connected via transverse shafts to the mentioned lateral components of the carrying structure.

Support units which are directly consecutive should be driven independently of one another, since according to a particular embodiment, in each case two support units which are directly consecutive must be driven with different speeds at least over certain part sections of the circulatory path. This is effected by way of the two support units being driven via different conveying means, such as drive belts or drive chains, which are arranged next to one another.

Moreover, a binding device, in which the main stacks are bound into packages or lots, can be arranged downstream of the device, as part of a subsequently described processing installation. Moreover, a conveying-away device, in which the stacks or packages are conveyed away from the device or the binding device can be assigned to the device. The conveying-away device can e.g. comprise a plate conveyor or a link belt conveyor.

The invention further relates to a processing installation for processing product units with different product characteristics. This comprises at least one processing device as well as conveying means for conveying the product units in the processing device. The conveying means are preferably arranged between two processing devices.

Moreover, the processing installation comprises a control device for the control of the at least one processing device, as well as adjustment means for adapting at least one influence variable for influencing the product units or parts thereof, at the at least one processing device, to the different product characteristics.

With regard to the influence variable for influencing the product units or parts thereof, it is preferably the case of the geometry of a component arrangement in the processing device.

Such a geometry and the associated component arrangement can for example be side guide elements and their position relative to a conveying member or the product units, a welding bar and its position relative to a conveying member or to the product units, feed means for a packaging film and its position relative to a conveying member, or aligning elements for aligning product units and their position relative to one another or to the product units.

The resetting or adjustment of the geometry of component geometry can e.g. be the changing of the position of a component relative to another component. The position can be defined e.g. by a distance, an angle or an inclination.

The resetting of the influence variable or the geometry of a component arrangement can also mean the exchange or starting operation or shut-down operation or connection or disconnection of functionally effective components, modules, subassemblies, devices or stations. Thus this can concern e.g. the connection or disconnection of a feed station.

The adaptation of an influence variable can also mean a change of the action of a component, in particular tool, on the product units. Thus e.g. welding parameters such as welding temperature and welding duration, for welding a packaged product unit can be dependent on product characteristics.

Moreover, variables such as the strength of an electric field, the speed with which a tool e.g. a welding bar is moved, the temperature for processing/treating a product, a tensioning force, e.g. of the packaging film, the intensity of compressed air, the intensity of blown air, a vacuum or excess pressure can be influence variables which are dependent on product characteristics.

Moreover, the selection of the packaging material to be applied and which has different characteristics, e.g. packaging material of a different thickness or tear strength, in dependence on product characteristics such as size and weight of the product unit, can also be such an influence variable.

Moreover, the influence variables can also include parameters for setting sensors for the purpose of adapting to the changed characteristics of the product units or parts thereof.

The changes of the length, width and/or height, i.e. in particular of the dimension of the product units, or parts thereof, given a format change, contributes to the advantageous implementation of the method according to the invention, preferably up to 20% at the most, in particular up to 10% at the most, of the corresponding initial value.

The processing installation is then characterised in that the adjustment means are designed for adaptation of the at least one influence variable to the changed product characteristics of a subsequent product unit, with continued conveying operation.

The adjustment means are thereby controllable via the control device, in a manner such that the adaptation of the at least one influence variable is effected in a time period directly before, during or directly after the running of a last product unit with the first product characteristics, and directly before, during or directly after the running of a subsequent first product unit with second product characteristics, through the processing device.

The at least one processing device is preferably a device described above, in particular stack forming device.

The invention further also relates to a method for operating a processing installation, in particular a processing installation with a device described above, such as stack forming device, in which product units with different product characteristics are processed.

The method is characterised in that the adaptation of the at least influence variable to the changed product characteristics of a subsequent product unit is effected via the adjustment means with a continued conveying operation, and wherein the adjustment means are controlled via the control device in a manner such that the adaptation of the at least one influence variable is effected directly before, during or directly after the running of a last product unit with first product characteristics and directly before, during or directly after the running of a subsequent first product unit with second product characteristics, through the processing unit.

The product characteristics include e.g. the dimension, in particular the size format, of the product units or parts thereof.

A product gap can be formed between the last product of a preceding (leading) product stream with first product characteristics which e.g. corresponds to a first product lot, and the first product of a subsequent (trailing) product stream with second product units which e.g. corresponds to a second product lot, for the purpose or resetting the product characteristics in the at least one processing device.

The resetting of the processing device from the first to the second product characteristics is thereby effected during the running of the gap through the processing device. The two product streams can however also be subsequent to one another in a gapless manner. Expressed generally, the first product unit of a subsequent product stream, in comparison to the product distance within the subsequent and/or preceding product stream, can form the same distance or a different or larger distance to a preceding last product unit of a preceding product stream with different product characteristics.

The conveying speed in the processing installation during the resetting of the at least one influence variable to the changed product characteristics can be changed, in particular reduced, with respect to the nominal speed, before and after the resetting. The conveying speed however can also be retained during the resetting.

As mentioned, the at least one processing device is preferably a stack forming device wherein the adaptation of the at least one influence variable to the changed product characteristics relates to the setting of the distance between two lateral stack limitation elements and/or of the distance between the lateral outer edges of at least one support unit of the stacking device, by way of the adjustment means. In this case, with the change of the size format, in particular the width, of the product units to be stacked, the distance between the lateral outer edges of the at least one support unit is changed and adapted to the changed size format of the subsequent product units via the control device. The wider the product units, the further are the stack limitation elements or the lateral outer edges distanced to one another. For this, the drive member of the adjustment means, in particular of the respective screw mechanism is activated via the control device.

The control of the at least one processing device can be effected centrally via a central control device, also called central installation control, or locally by the local control device of the processing device concerned.

According to a further development of the processing installation, the products or the product units at least in regions are conveyed through the processing installation in a cycled manner. This cycle is set by a central control device. The product stream as a result is cycle-monitored at least in regions.

According to this further development, the central installation control can assign a data package to each individual conveying cycle and accordingly to the conveying member assigned to this conveying cycle, as well as to the product or product unit, which are conveyed with the conveying member. This data package is likewise led in a cycled manner through the processing installation to a control unit of the at least one processing device.

The data package contains control data based on product characteristics, or information from which control data for the local control unit can be derived. The local control unit uses the control data or information of the data package for resetting a component arrangement to the changed product characteristics.

The data package is thus fixedly assigned to a certain cycle and is preferably transferred also in a cycled manner. For this, a digital cycle picture of the processing installation is created in the installation control. To each cycle of this cycle image is then assigned a data package, amongst other things with the characteristics of the product units conveyed with this cycle.

The data package for example comprises information as to whether the cycle carries along a product at all, as well as information on the product characteristics of the individual products of a product unit or of the product unit. This can e.g. be the dimension (length, width, height) or the format, the shape, the weight, the material nature, the surface characteristics, the surface texture, the stiffness, the quality, the product condition, any occurring damage, the number of products in the product unit, or the address, to which the product unit is to be delivered.

The data package together with the product unit or with the associated cycle, moves through the processing installation and passes the different processing devices, as also the case with the product units or products.

The data package is led through the processing installation e.g. simultaneously with the cycle. The data package can however also precede the physical conveying cycle, so that the processing installation concerned receives control-relevant information on a product or product unit before the arrival of this. In this manner, the respective setting of characteristics variables of the processing device, in particular of a component arrangement, to the product characteristics of the subsequent products or product units with changed product characteristics, can be carried out before these arrive in the processing device or at the related location in the processing device.

The information such as e.g. details on the dimension of the products or product units, which are the basis for the generation of control signals for the purpose of adaptation of the influence variable, can e.g. be determined by sensor devices which are arranged along the conveying stretch in the processing installation. The sensor devices can operate according to an opto-electrical method or photo-optical methods. The information can however also be called up from a data memory or be fed into the control device externally.

In this context, the pending international application PCT/CH 2011/000232 is referred to, which likewise describes the control concept described above in detail, and its content with respect to this is to be considered as part of the disclosure.

Information on the product characteristics, in particular the dimensions or size formats, of the product units to be processed or their products, are transferred e.g. to the central control device before the resetting, for carrying out the method according to the invention.

The control device on the basis of the transmitted product characteristics generates control data or information which is transferred to the at least one processing device, in particular to a local control device of the processing device, for the purpose of resetting to the changed product characteristics.

The control data or information preferably corresponds to the command variables for the adjustment means or the output variables such as e.g. the characteristic variables of the product units or products, for computing the command variables.

The stack forming device according to the invention or the processing installation which can contain the stack forming device according to the invention, have the advantage that the influence variables at the processing devices which can be embodied for example by settable machine parts such as support elements or side guide elements and which are interactively connected to the product units or their products, can be adapted to the changed characteristics, in particular dimensions or size formats, of subsequent product units or their products, during the operation via the control device. The operation of the processing installation for this no longer needs to be interrupted. The processing devices and the associated conveying means in contrast continue to run, even if the processing speed of the installation is lowered during a resetting phase and/or the product gap is led through the processing devices.

BRIEF DESCRIPTION OF THE DRAWINGS

The subject matter of the invention is hereinafter explained in more detail by way of preferred embodiment examples which are represented in the accompanying drawings. In each case are schematically shown in:

FIG. 1c is a plan view of the stack forming device in the region of the stack formation according to FIG. 1a;

FIG. 8 is a plan view of a third embodiment of a processing installation according to the invention.

Basically, the same parts are provided with the same reference numerals in the figures.

DETAILED DESCRIPTION OF THE INVENTION

Figure 1C:
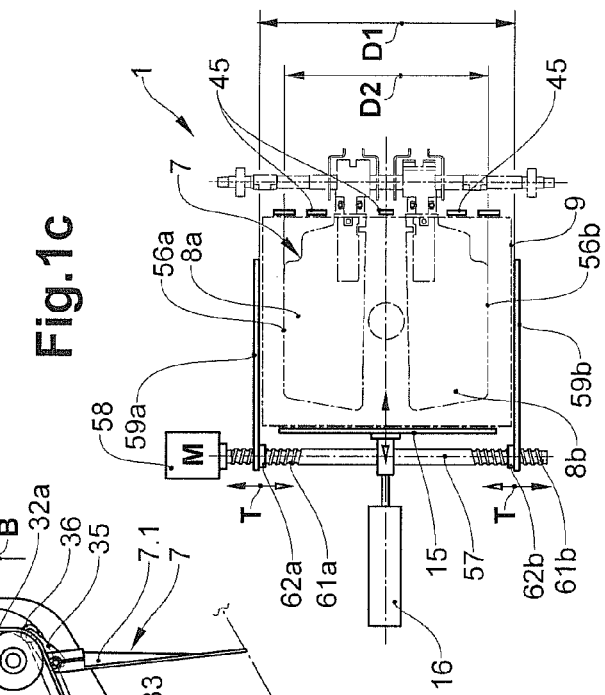
Figure 1A:
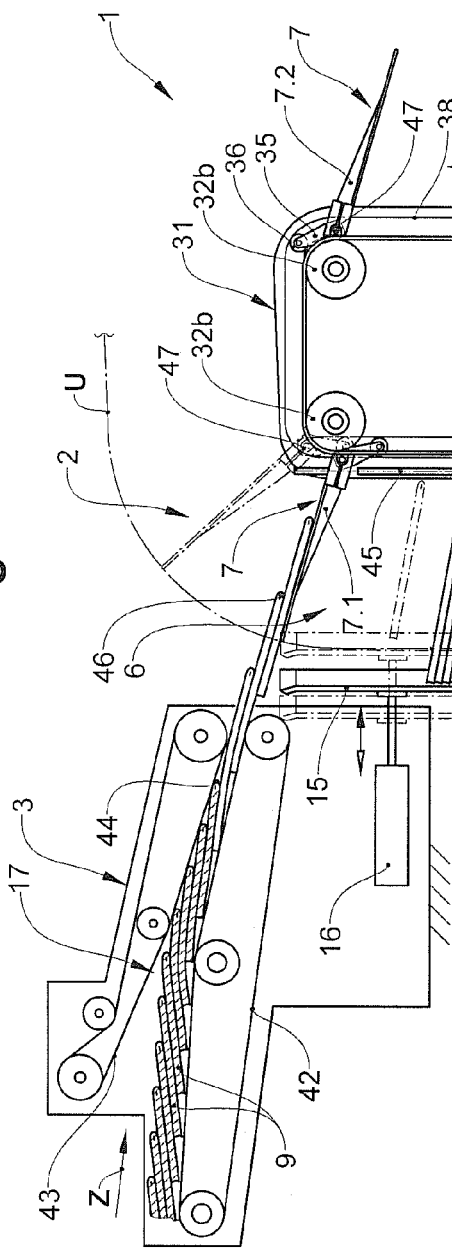
FIG. 1a is an elevation view of a stack forming device according to the invention.

FIG. 1a shows a stack forming device 1 according to the invention, which corresponds to a further development of the stack forming device disclosed in EP 2 138 439 A2. The stack forming device 1 according to FIG. 1a comprises a stacking device 2 with a stacking shaft 4 which is composed of a preliminary stacking shaft 6 and of a main stacking shaft 5 as well as of a circulatory arrangement 31.

The main stacking shaft 5 is delimited to all four sides by stack guide means 18, here designed as corner profiles, and to the bottom by a stack support 12 which can be lifted and lowered, here a designed as a stack table. The stack support 12 is rotatable about a vertical axis V by 180° (angle degrees) in each case, in order to be able to receive intermediate stacks or preliminary stacks 10, in a manner offset by 180° to one another in each case. If a main stack 11, also called finished stack, which consist of at least one preliminary stack 10, preferably however of several preliminary stacks 10, is formed in the main stacking shaft 5, the stack support 16 is completely lowered and the main stack 11 is conveyed out of the main stacking shaft 5 in the generally known way and manner. In this context, it is expressly mentioned that the main stacking shaft 5 can also be designed as disclosed in the document EP 1 445 224 A.

A preliminary stack 6 which cooperates with a circulatory device 31 is arranged above the main stacking shaft 5. The stack forming device 1 further comprises a feed device 3 for feeding two-dimensional product units 9, in the present case folded printed products, such as newspapers or magazines, to the preliminary stacking device 6.

The feed device 3 here is designed as a belt conveyor. The belt conveyor 3 comprises a conveyor belt 42 driven in a circulatory manner in the feed direction and a pressing belt 43 which is arranged above this conveyor belt and which together forms a conveying gap 44 for the product units 9.

The product units 9 lie on the conveyor belt 42 in an imbricate formation, wherein each product unit 9 partially lies on the product unit which leads in the feed direction Z. The conveying gap 44 seen in the feed direction Z ends at the upper end of the preliminary stacking shaft 6, so that the product units 9 are fed from above and from the side, to the preliminary stacking shaft 6.

Figure 1B:
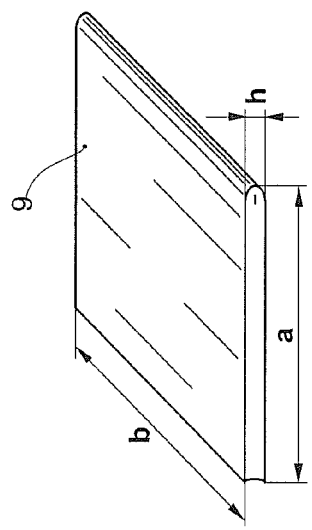
FIG. 1b is a perspective view of a product unit.
Figure 2:
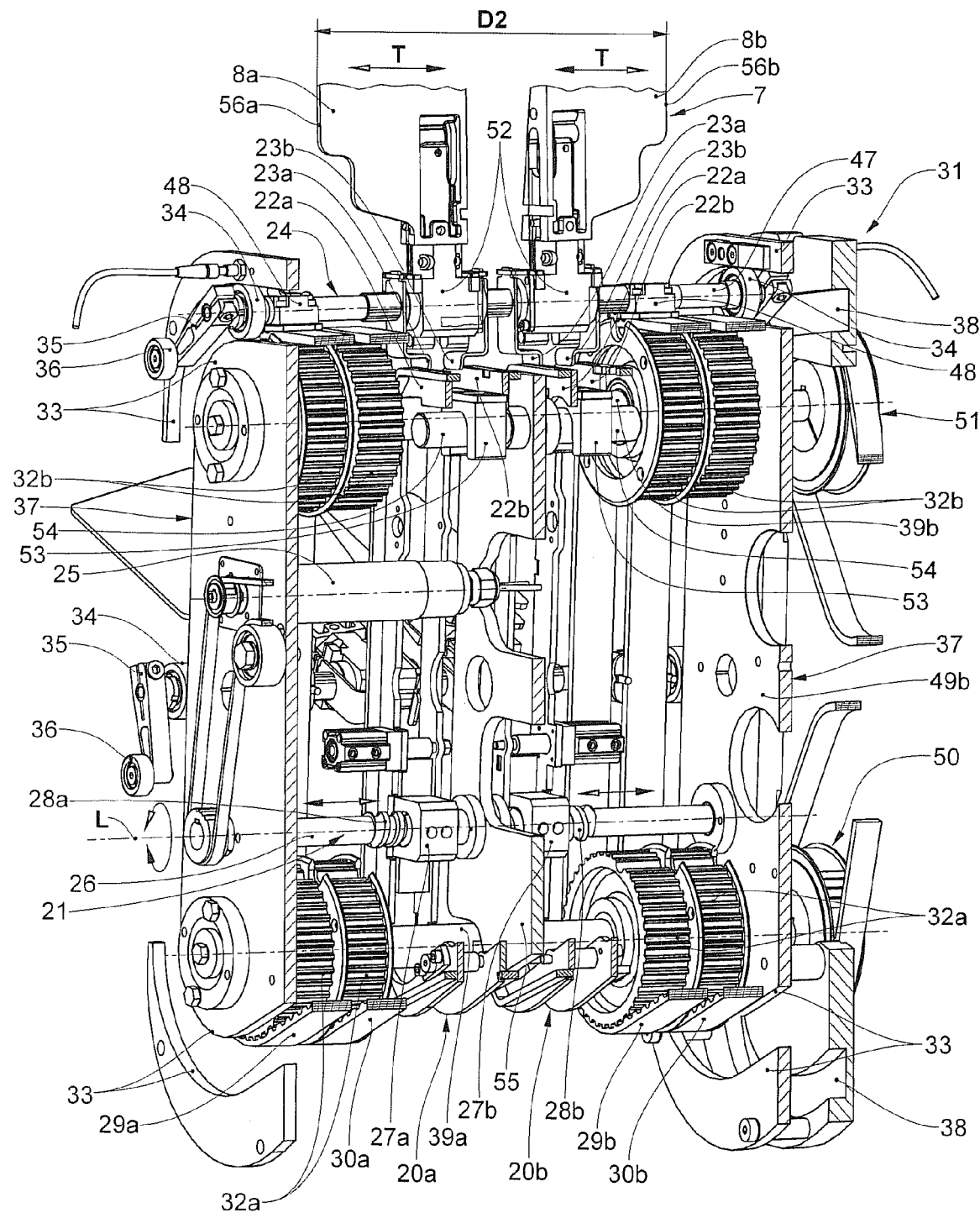
FIGS. 2 and 3 are perspective views of a circulatory arrangement.
Figure 3:
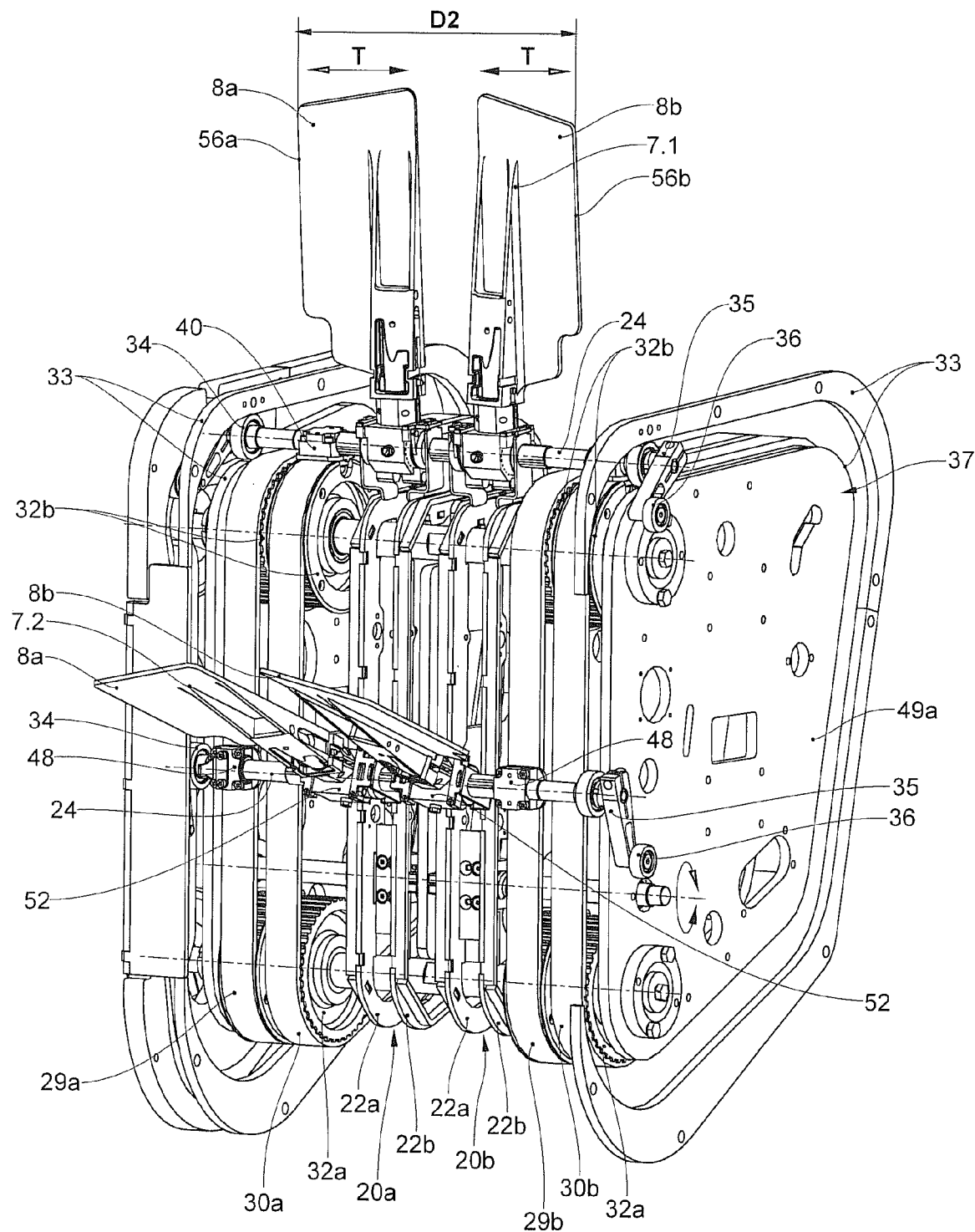
Figure 4:
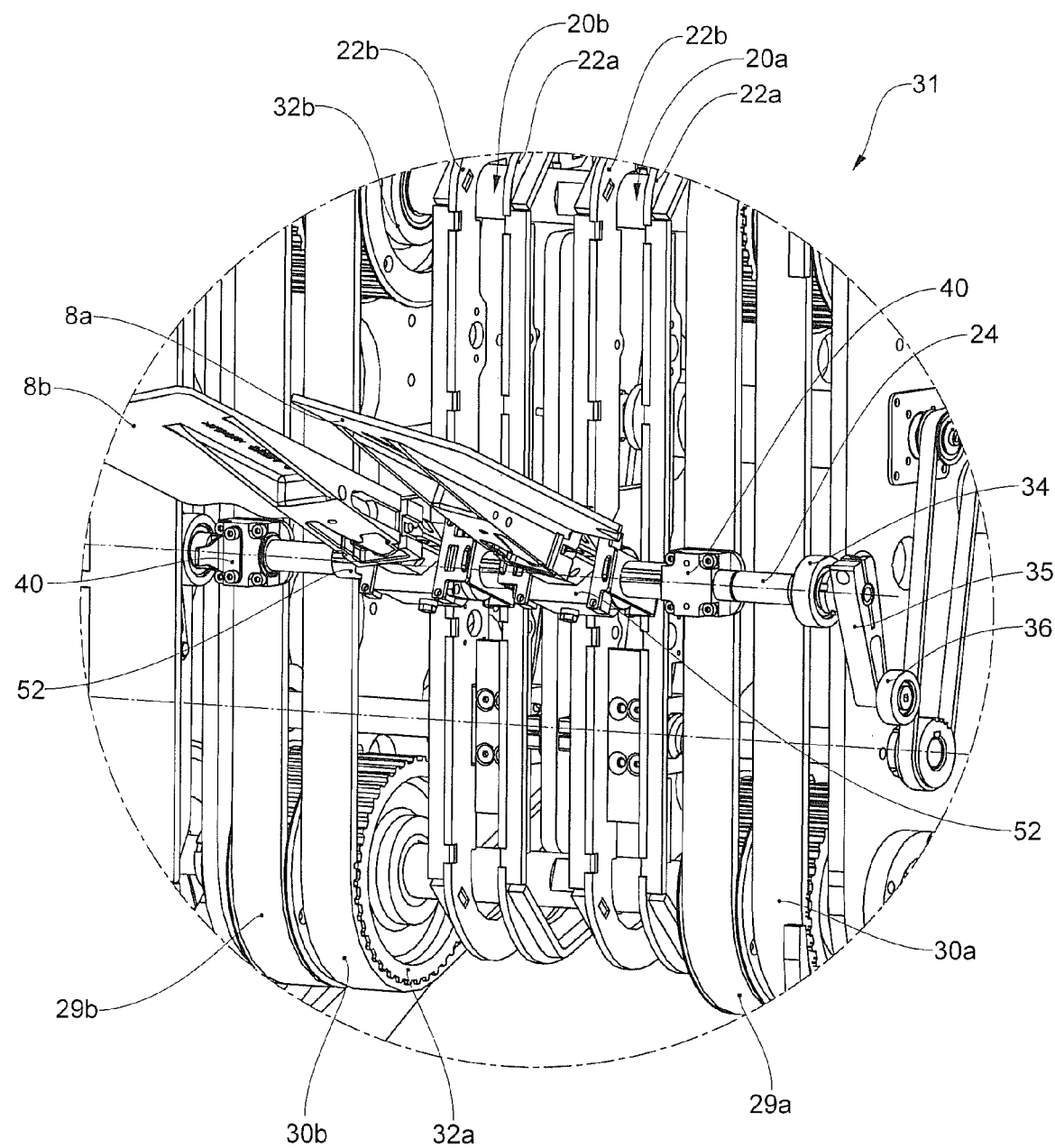
FIGS. 4 and 5 are perspective views of enlarged details from the FIGS. 2 and 3.
Figure 5:
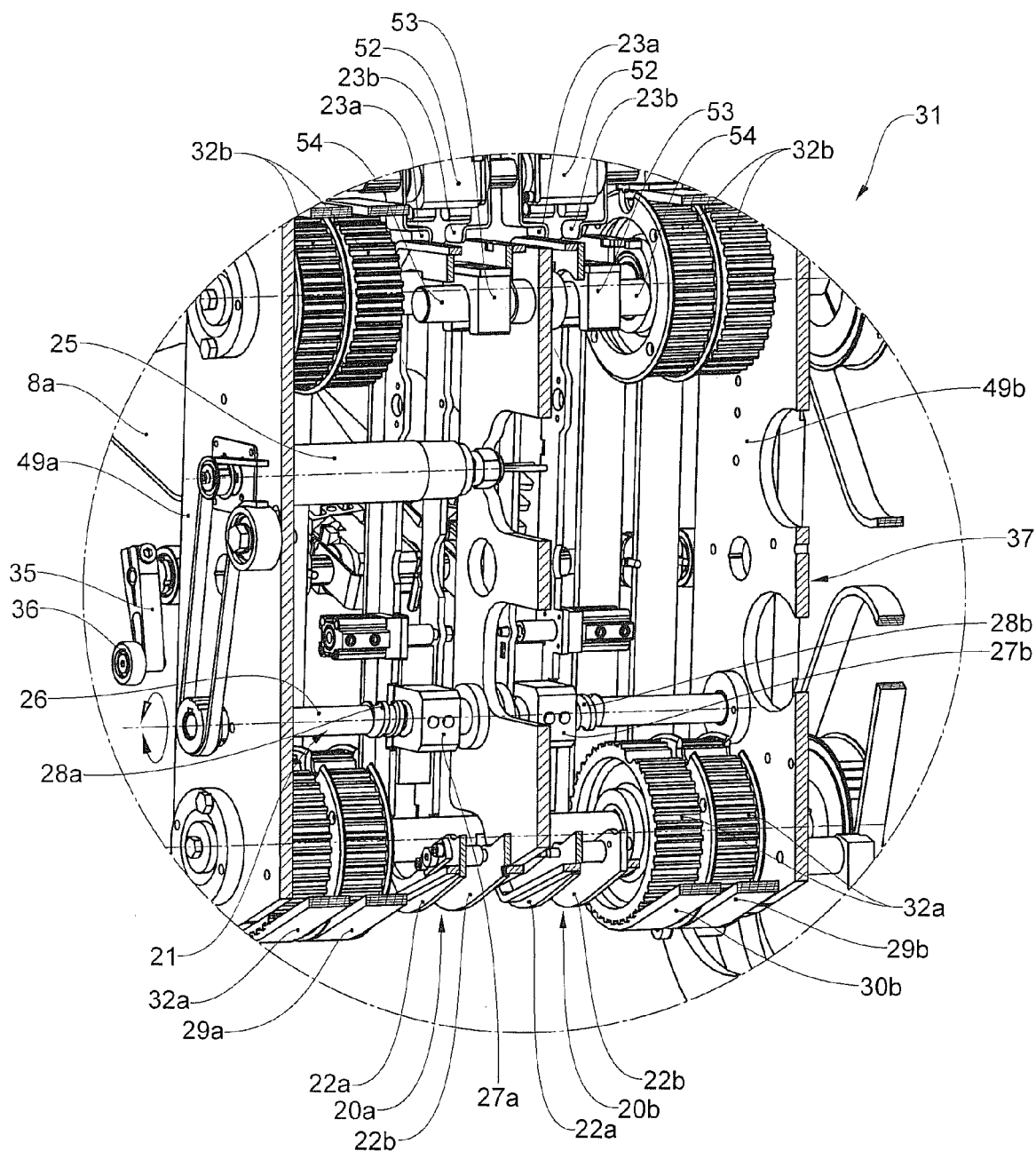

A product unit 9, as is schematically shown in FIG. 1*b*, is characterised by a width b, a depth a, as well as a height h.

The preliminary stacking shaft 6 seen in the feed direction z, on the side lying opposite the feed is delimited by a front stack limitation element 45, here in the form of a stop bar, which runs in the vertical direction. The product units 9 released from the conveying gap 44, with their leading edge 46 come into contact with the stop bar 45.

The preliminary stacking shaft 6 is delimited on the side which faces the feed by a rear stack limitation element 15, here in the form of a two-dimensional wall element. The position of the rear stack limitation element 15 is settable towards the circulatory arrangement 31 by way of an adjusting element 16, for example with actuators, such as a cylinder-piston assembly, according to the depth a of the product units 9 to be stacked.

The preliminary stacking shaft 6 is delimited by non-shown, lateral stack limitation elements, e.g. in the form of wall elements, at the remaining two sides which seen in FIG. 1 run parallel to the surface of the drawing.

A circulatory arrangement 31 with drive means for support units 7 which revolve along a circulatory path U and which are described in more detail in combination with the FIGS. 2 to 5 is located on the side of the preliminary stacking shaft 6 which lies opposite the feed.

The circulatory arrangement 31 comprises four support units 7 which are arranged one after the other along a circulatory path U, wherein in each case a first support unit 7.1 and a second support unit 7.2 alternately succeed one another. The two first support units 7.1 are arranged on a first conveying means, in the present case consisting of two toothed belts 29*a*, 29*b*, whilst the two second support units 7.2 are arranged on a second conveying means, consisting of two further toothed belts 30*a*, 30*b*. The two toothed belt pairs are driven independently of one another as is described in more detail hereinafter by way of FIGS. 2 to 5.

As represented in FIG. 1*a*, the support units 7 are pivotably mounted about a pivot axis 47 which runs transversely to the circulatory path U and thus to the circulatory direction or movement direction B of the support units 7.

As is to be deduced from FIG. 1*c*, the stack forming device 1 according to the invention comprises a first and second, lateral stack limitation element 59*a*, 59*b* which are arranged laterally in the feed direction Z of the product units 9, and which laterally align the product units 9 collated into preliminary stacks 10. The lateral stack limitation elements 59*a*, 59*b* have a distance D1 to one another, which depends on the width of the product units 9.

The two lateral stack limitation elements 59*a*, 59*b* are part of a side limitation device 60 which moreover comprises a screw mechanism with a threaded spindle 57 with mating threaded sections 61*a*, 61*b* which are arranged along its longitudinal axis. The threaded spindle 57 is arranged transversely to the feed direction Z.

A first threaded section 59*a* engages into a first mating thread body 62 which is connected to a first lateral stack limitation element 59*a*. A second threaded section 59*b* engages into a second mating thread body 62*b* which is connected to the second lateral stack limitation element 59*b*. The two lateral stack limitation elements 59*a*, 59*b* then with a spindle rotation move to one another or way from one another in opposite directions. In this manner, both lateral stack limitation elements 59*a*, 59*b* can be laterally displaced to one another in opposite directions via a common threaded spindle 57. The threaded spindle 57 for this is driven via a drive motor 58, i.e. is set into rotation. The distance D1 can be changed and adapted to the product format by way of this lateral displacement.

As is evident from the FIGS. 2 to 5, each support unit 7 comprises two support elements 8*a*, 8*b* which are designed in a two-dimensional manner, are distanced to one another transversely to the circulatory path or in the direction of the pivot axis 47, and via holders 52 are fastened on a transverse guide element 24 running parallel to the pivot axis 47. The support elements 8*a*, 8*b* are displaceable in the lateral direction T, but are mounted on the transverse guide element 24 in a rotationally fixed manner.

The holders 52 for this comprise an opening, through which the transverse guide element 24 is led in a laterally displaceable, but rotationally fixed manner. The transverse guide element 24 in the present embodiment example is designed as a round profile. The holder 52 can be designed of one part or of several parts.

For the sake of completeness, it should yet be mentioned that the front stack limitation element 45 in the stacking shaft 4 is positioned between the two support elements 8*a*, 8*b* and/or next to this.

The circulatory arrangement 31 comprises a carrying structure 37, on which the device components are fastened in a direct or indirect manner. The carrying structure 37 amongst other things comprises two lateral plates 49*a*, 49*b*.

The transverse guide elements 24 in each case on both sides at their lateral ends comprise a cam roller 34 which cooperates with a cam guide 33 on the lateral plates 49*a*, 49*b*. The transverse guide elements 24 and with them the support elements 8*a*, 8*b* are led in the peripheral direction B via the cam roller 34 led in the control cam 33.

In the present embodiment example, the cam rollers 34 of all support units 7 and which are arranged on both sides are led along two common, laterally arranged cam guides 33 designed in a mirror-inverted manner 33, with a closed guide path. The circulatory path U set by the cam guide 33 has a working section which runs essentially vertically and parallel to the stacking shaft 4 and along which the support elements 8*a*, 8*b* of the support units 7 are led from the top to the bottom, thus following gravity, through the preliminary stacking shaft 6.

The transverse guide element 24 is mounted in a freely rotatably manner on bearing elements 48, wherein the bearing elements 48 are fastened on the toothed belts 29*a*, 29*b*; 30*a*, 30*b* which are assigned to these. The transverse guide elements 24 and thus the support elements 8*a*, 8*b* are then driven via the bearing elements 48 along the circulatory path U by the toothed belts 29a, 29b; 30a, 30b.

Moreover, in each case a pivot arm 35 with a distally arranged cam roller 36 is arranged in a rotationally fixed manner on the transverse guide element 24 on both ends. The pivot position of the support elements 8a, 8b can now be changed by way of the movement of the pivot arm 35 about the pivot axis 47 of the transverse guide element 24. For this, the cam roller 36 of the pivot arm 35 cooperates with a further cam guide 38, via which the position of the pivot arm 35 about the pivot axis 47 and thus the pivot position of the support elements 8a, 8b can be set.

In the present embodiment example, the cam rollers 36 of all support units 7 and which are arranged on both sides are led in two laterally arranged common cam guides 38 with a closed guide path (not shown). The two cam guides 38 which are designed and arranged in a mirror-inverse manner form the pivot guide. The pivot position of the support unit 7 is controlled in a manner such that the support elements 8a, 8b are pivoted into the preliminary stacking shaft 6 on entry into the previously mentioned working section. Moreover, the pivot position of the support unit 7 is controlled in a manner such that the support elements 8a, 8b are pivoted out of the preliminary stacking shaft 6 on leaving the working section amid the release of the preliminary stack 10 onto the stack table 41 lying therebelow.

The toothed belt pairs 29a, 29b as well as 30a, 30b which in each case drive the first or second support units 7.1, 7.2 are both led at the upper end of the preliminary stacking shaft 6 around upper deflection rollers 32b arranged on the same axis, and in a lower end of the preliminary stacking shaft 6 about lower deflection rollers 32a which are likewise arranged on the same axis. The working section of the circulatory path U which is directed to the feed device 3 and is led through the preliminary stacking shaft 6 in an essentially vertical manner runs between the upper and lower defection rollers 32a, 32b.

The four lower deflection rollers 32a are arranged on a common lower shaft 39a which is connected via a toothed belt drive 50 to a first drive member (not shown). Accordingly, the four upper deflection rollers 32b are arranged on an upper shaft 39b which for its part is connected via a toothed belt drive 51 to a second drive member (not shown).

The lower deflection rollers 32a, around which the toothed belts 29a, 29 are guided, are connected to the lower shaft 39a in a rotationally fixed manner, whilst the two other lower deflection rollers 32a, around which the further toothed belts 30a, 30b are led, are mounted on the lower shaft 39a in a freely rotatable manner. The lower shaft 39a is thus a drive shaft for the toothed belt 29a, 29b and thus the first support units 7.1.

The first support units 7.1 are thus driven by the first drive member.

Accordingly, the upper deflection rollers 32b which are assigned to the further toothed belts 30a, 30b are seated on the upper shaft 39b in a rotationally fixed manner, whilst the upper deflection rollers 32b assigned to the toothed belts 29a, 29b are mounted on the upper shaft 39b in a freely rotatable manner.

The second support units 7.2 are thus driven by the second drive member. The bearings for the shafts are fastened on the two lateral plates 49a, 49b.

The support elements 8a, 8b of the support units 7 which revolve in a common plane along the circulatory path U are actively connected in each case to a common positioning means 20a, 20b which is in the position of displacing the support elements 8a, 8b of a support unit 7 laterally relative to one another and of setting the distance D2 between the lateral outer edges 56a, 56b of a support unit 7.

The circulatory arrangement 31 now comprises a first positioning means 20a for the first support elements 8a of the support units 7, and a second positioning means 20b for the second support elements 8b of the support units 7 which are arranged next to one another and distanced to one another between the two side plates 49a, 49b in the circulatory arrangement 31. Moreover, an intermediate plate 55 as a further component of the carrying structure 37 is arranged between the two positioning means 20a, 20b.

The positioning means 20a, 20b in each case comprises two side limitation components 22a, 22b which are distanced to one another, led in parallel next to one another and are in the form of guide bars or strips, with a side limitation surface peripherally closed in the circulatory arrangement 31 in the movement direction B of the support units 7. The side limitation components 22a, 22b in particular are also led around the upper and lower drive shaft 39a, 39b.

In each case, two guide tabs 23a, 23b are assigned to each support element 8a, 8b and are mechanically actively connected to this. The guide tabs 23a, 23b here are connected laterally or axially displaceably to the transverse guide element 24. The guide tabs 23a, 23b can however also be connected to the associated holders 52.

The guide tabs 23a, 23b comprise guide sections which on the side lying opposite to the support elements 8a, 8b engage between the side limitation components 22a, 22b. If the positioning means 20a, 20b now moves in one of the two lateral directions T transversely to the circulatory direction B, then the one of the two side limitation components 22a, 22b comes to abut with one of the two guide tabs 23a, 23b, so that given a continued lateral displacement, the guide tab 23a, 23b and thus the associated support element 8a, 8b are caught and are likewise displaced laterally along the transverse guide element 24.

On displacing the positioning means 20a, 20b in the other lateral direction, the other side limitation component 22a, 22b comes to abut on the other guide tab 23a, 23b, so that given a continued lateral displacement, the another guide tab 23a, 23b and thus the other associated support element 8a, 8b is caught and is displaced in the other lateral direction along the transverse guide element 24.

The two side limitation components 22a, 22b are connected to one another via connection elements 53. The connection elements 53 and thus the positioning means 20a, 20b are mounted in a laterally displaceable manner on transverse axis elements 54. The transverse axis elements 54 are fastened on an intermediate plate 55 of the carrying structure 37 which lies between the two side plates 49a, 49b.

The lateral displacement of the two positioning means 20a, 20b is effected via a common screw mechanism 21. This has a threaded spindle 21 driven by a drive motor 25. The threaded spindle 26 along its longitudinal axis comprises two counter-running threaded sections 28a, 28b. A first threaded section 28a engages into a first mating thread body 27a connected to the first positioning means 20, and a second threaded section 28a engages into a second mating thread body 27b connected to the second positioning means 20b. The positioning means 20a, 20b now move to one another or away from one another in opposite directions, given a rotation of the spindle. In this manner, both support elements 8a, 8b can be uniformly laterally displaced to one another in opposite directions via a common threaded spindle and a common rotation movement.

The threaded spindle 26 on the one hand is rotatably mounted on the two side plates 49a, 49b and on the other hand on the intermediate plate 55. A belt gear, via which the drive moment is transmitted from the drive motor 25 onto the threaded spindle 26, is arranged on one of the two side plates 49a. The drive motor 25 is arranged between this one side plate 49a and the intermediate plate 55 and is supported on the mentioned plates 49a, 55.

The manner of functioning of the device according to the invention is described starting from the situation represented in FIG. 1. The support elements 8a, 8b of a first support unit 7.1, at an upper end of the preliminary stacking shaft 6 are located with their freely lying end facing the feed. The product unit 9 which is at the very front seen in the feed direction Z and which has already been released from the conveying gap 44, slides on the support elements 8a, 8b of the first support units 7.1 which are arranged in an obliquely dropping manner seen in the feed direction Z, onto the front stack limitation element 45, from where it is stopped and on which it comes to bear. The subsequent product units 9 led thereon in an imbricate formation accordingly slide on the respective preceding product units 9, amid the formation of a preliminary stack 10, into the preliminary stacking shaft 6. The first support unit 7.1 is lowered along the circulatory path U in the circulatory direction B in accordance with the height of the already stacked product units 9.

According to FIG. 1, a second support unit 7.2, on which a previously created preliminary stack 10 is arranged, is located below the first support unit 7.1. Departing from this position, the two support units 7.2 are accelerated and moved along the circulatory path U in the circulatory direction B, until the other second support unit 7.2 is located in the waiting position indicated in a dot-dashed manner. The second support unit 7.2 which is loaded with the preliminary stack 10 is pivoted rapidly in the downward and lateral direction out of the preliminary stacking shaft 6 by way of the deflection of the lower, second support unit 7.2 about the lower deflection rollers 32a and in a manner controlled by the pivot guide, by which means the preliminary stack 10 concerned is released from the second support unit 7.2 and released to the stack table 41 or to a preliminary stack 10 which is already arranged on this.

After the transfer of an intermediate stack 10 onto the stacking shaft 41, this stacking shaft can be rotated about a vertical axis by 180° (angle degrees) by way of rotation means 14, so that a straight main stack 11 can be constructed, in which the consecutive preliminary stacks 20 are arranged rotated by 180° in each case. The stack stable 41 is lifted into an upper end position for receiving a first preliminary stack 10 in each case, and is then lowered by way of height adjustment means 13, in each case in a manner depending on the height of the preliminary stack 10. If a main stack 11 is completed, the stack table 41 is completely lowered and in a generally known way and manner the main stack 11 is conveyed out of the main stacking shaft 5.

If a preliminary stack 10 is completed on the first support unit 7.1, according to FIG. 1, the second support unit 7.2 which is directly subsequent to this first support unit 7.1 seen in the circulatory direction B and which is situated in the waiting position, is brought in the circulatory direction B into the receiving position—in which the first support unit 7.1 is shown with unbroken lines—in order to form a further preliminary stack 10 thereon from further fed product units 9. On moving the respective support unit 7.1, 7.2 from the waiting position into the receiving position, the two support units 7.1, 7.2 with their freely lying end which faces the feed plunge between two consecutive product units 9, by which means a separation of the product units 9 is ensured without any problem, even with a very high processing capacity. The described working cycle is thus repeated as often as is necessary, in an alternating manner with first and second support units 7.1, 7.2. A stack formation cycle for forming a main stack 11 lasts for 1.8 seconds for example. In the present embodiment example a main stack 11 is formed from two preliminary stacks 10. The formation of a preliminary stack then takes place in 0.9 seconds in accordance with the above mentioned time detail. The plunge time of the support unit is accordingly short, and corresponds to a fraction of 0.9 seconds. The plunging procedure is designed such that the support unit 7.1, 7.2 plunges between two consecutive product units 9, wherein the preceding product unit is still led to the preceding preliminary stack and the subsequent product unit forms the first product unit of the subsequent preliminary stack.

If then the size format of the product units 9 changes during operation, then the drive motor 25 of the adjustment means 21 is activated via the control device, and the distance D2 between the lateral outer edges 56a, 56b of the support units 7 is set to the changed format of the product units 9 by way of the rotation of the threaded spindle 26. The format setting where possible is controlled such that the support units 7 are introduced into the stack formation process in the preliminary stacking shaft 6, with the correct format setting, which is to say with the correct distance D2 between the lateral outer edges 56a, 56b of the support units 7. For this, from case to case, a gap between the product units 9 of a first product stream and the product units 9 with a changed size formats of a subsequent product stream is required. The change of the distance D2 can e.g. be effected during the change of the one support unit 7 from the waiting position into the receiving position, by way of plunging the two support elements 8a, 8b between two consecutive product units 9. Moreover, one can also envisage the support units 7 being reset individually to the changed size format.

The drive members which drive the first and second support units 7.1, 7.2 are controllable independently of one another with regard to time, depending on the product feed performance, the height of the preliminary stacks 10, the product page number, the desired conveying output of products etc.

Figure 6:
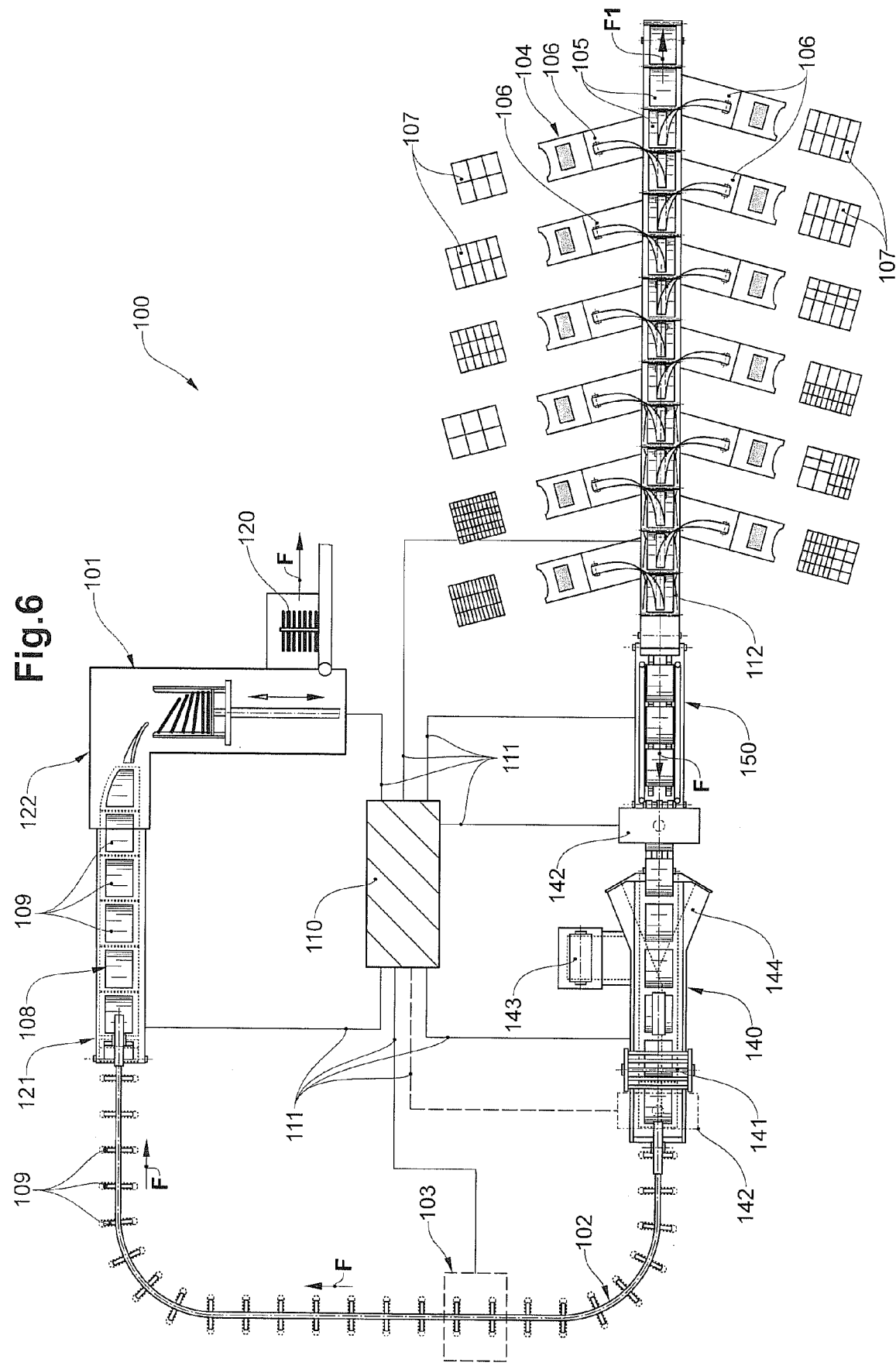
FIG. 6 is a plan view of a first embodiment of a processing installation according to the invention.
Figure 7:
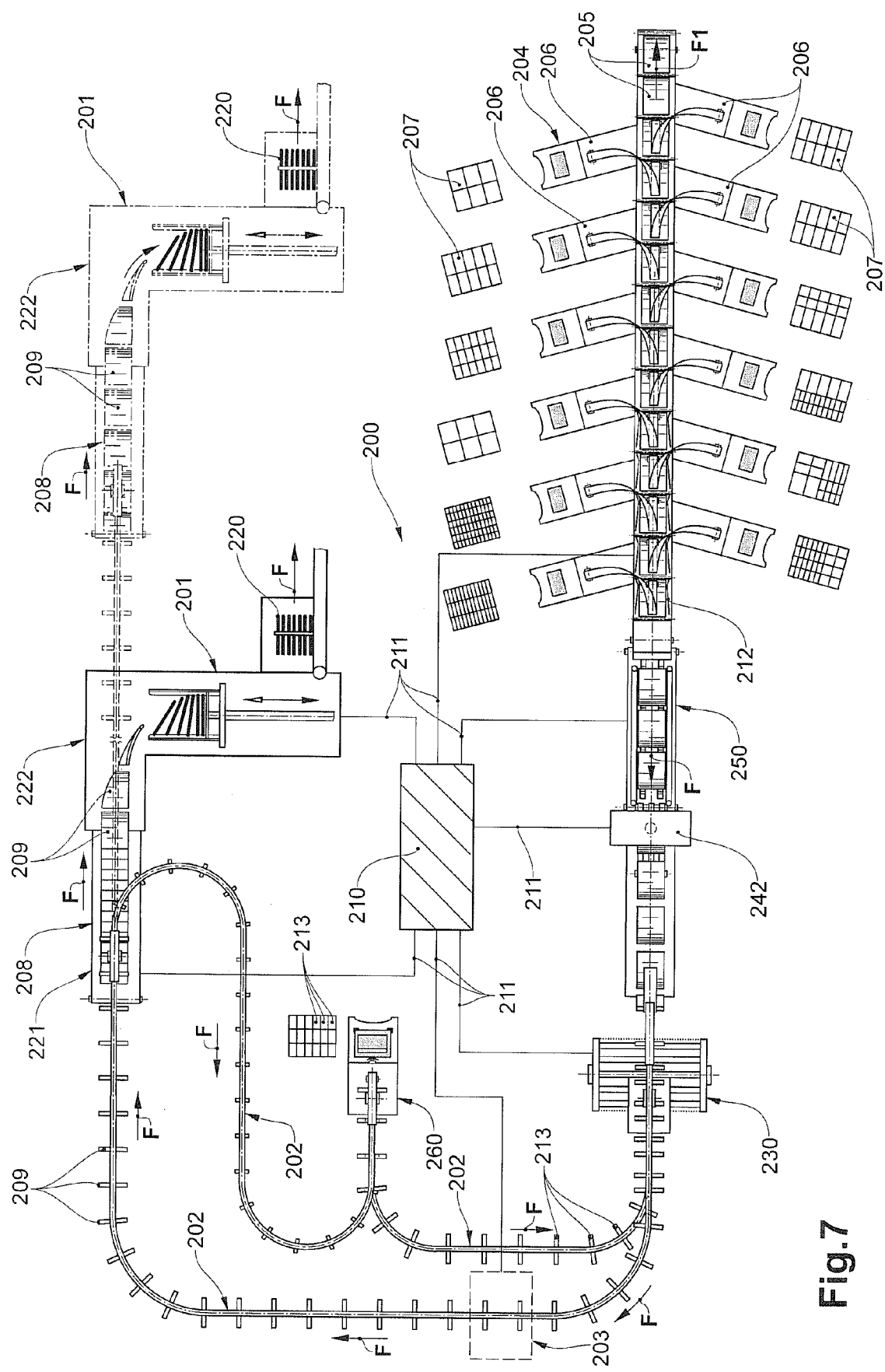
FIG. 7 is a plan view of a second embodiment of a processing installation according to the invention.

The embodiments of processing installations 100, 200, 300 which are shown in FIGS. 6 to 8 serve for processing two-dimensional, flexible printed products. Common to the shown embodiments is the fact that these in each case comprise a collating device 104, 204, 304 for collating the printed products into collections, compilations or compositions. Such a collating device is also described e.g. in CH 699 866. The collating device 104, 204, 304 comprises conveying means with a plurality of conveying compartments 105, 205, 305 which are displaceable one after the other along a conveying path.

The conveying compartments 105, 205, 305 are led past the feed units 106, 206, 306 which here arranged on both sides for example and whose number is twelve. Individual products are transferred via the feed units 106, 206, 306 from a stack to the conveying compartments 105, 205, 305 led past these, for the purpose of creating a collection.

The feed units 106, 206, 306 according to the shown embodiment are manually charged with products from pallets 107, 207, 307. Not all pallets with products are shown, for the sake of simplicity.

The feed units 106, 206, 306 can however also be charged automatically with products via an automated device. Thus the feed units can be supplied with products in an automated manner from a product reel (not shown).

Each conveying compartment 105, 205, 305 comprises a support surface, on which the products fed from the feed units 106, 206, 306 are deposited and are put together into a collection 114, 214, 314 which is part of a product unit 109, 209, 309 created later in the course of the processing process. The collating device 104, 204, 304 is moreover a side aligning unit 112, 212, 312 with side aligning means arranged on both sides of the conveying compartments 105, 205, 305, for the lateral alignment of the products deposited on the conveying compartments 105, 205, 305. It is of course also possible with the described device, to produce a sequence of individual products or stack of equal products. Moreover, it is also possible to collate part products of the same format, such as individual folded sheets or signatures.

The conveying compartments 105, 205, 305 here are led in a closed circulatory path, wherein the conveying compartments 105, 205, 305 are transported in an upper path section in a first conveying direction F1 and charged with products from the feed units 106, 206, 306. The conveying compartments 105, 205, 305 are led back along a lower path section (not shown) in a second conveying direction directed opposite to the first conveying direction F1.

Moreover, in each case a positioning device 150, 250, 350 for positioning and cycling in the collections 114, 214, 314, connects to the collating device 104, 204, 304 seen in the processing direction. The collections 114, 214, 314 are aligned laterally and at defined distances to one another in the positioning device 150, 250, 350, before the transfer to the subsequent processing device. The positioning device 150, 250, 350 can e.g. be a circulatory cam belt with leading and/or trailing cams, wherein the collections or product units 150, 250, 350 are aligned at the circulatory cams.

Moreover, common to the represented embodiments is the fact that these in each comprise a device for stacking product units 101, 201, 301, subsequent to further processing steps, in which the installations differ. The product units 109, 209, 309 are grouped together in the stack forming device 101, 201, 301 into product stacks 120, 220, 320 and are bound in a binding station for the subsequent transportation away.

The device for staking product units 101, 201, 301 comprises a feed device 121, 221 321, in which the product units 109, 209, 309 singularised in a product stream or in an imbricate stream 108, 208, 308 are fed to a stacking device 122, 222, 322 connecting to this. The device for stacking product units 101, 201, 301 according to the embodiment examples according to FIGS. 6 and 8 can be a device for stacking product units according to FIG. 1 and the accompanying description or according to the description in the general description part (see in particular FIGS. 6 and 7). The mentioned device 101, 201, 301 can however also be designed differently (see in particular FIG. 8). As is shown by way of FIGS. 7 and 8, the processing installation 101, 201, 301 can comprise one or more of the mentioned stack forming devices 101, 201, 301. The processing installation 101, 201, 301 can e.g. be designed with a diverter system (not shown) which permits the product units 101, 201, 301 fed to the stack forming devices 101, 201, 301 via a common feed device, to be fed to individual stack forming devices 101, 201, 301 in a targeted manner.

The feeding of the product units 101, 201, 301 to the individual stack forming devices 101, 201, 301 can also be effected via a targeted release of clips, for example grippers, if these lead the product units 101, 201, 301 past the individual stack forming devices 101, 201, 301.

The embodiment of a processing installation 100 which is represented in FIG. 6 comprises a packaging device 140 arranged subsequently to the positioning device 150. An addressing unit 142 is arranged between the positioning device 150 and the packaging device 140 or at the beginning of the packaging device 140. The addressing unit 142 can however also be arranged subsequently to or at the end of the packaging device 140. The addressing unit 142 for this is designed as an exchangeable module which selectively can be coupled to the processing installation before or after, which is to say at the beginning or end of the packaging device 140. Of course, the addressing module can also be part of the packaging device 140. The collections 114 in the addressing unit 142 are provided with an address which is deposited directly onto an outer-lying product e.g. via suitable writing means or which, deposited on a separate cover sheet or label, is fed to the collection 14. If the address however is incorporated on the packaging wrapper or is stuck onto the packaging wrapper via a label, then the addressing unit can also be arranged subsequently to the packaging unit.

The collections 114 subsequently to the addressing unit 142 or the positioning device 150, in series one after the other and distanced to one another, via suitable conveying means are led into the packaging device 140 where these are wrapped with a quasi endlessly fed packaging material web 144. The packaging device 140 for this comprises means 143 for feeding a packaging material web 144 as well as for conveying the packaging material web 144 together with the collections 114 conveyed in series on a conveying underlay. Moreover, the packaging device 140 comprises a device for turning over the packaging material web and for the complete wrapping of the collections 114. In a subsequent transverse welding unit 41, the packaging wrapper arranged around the collection 114 is closed via longitudinal and transverse connections which can be designed e.g. as welding seams. The collections 114 packaged into product units 109 are subsequently separated from one another along the transverse connections. The packaging material web 44 is preferably a plastic film.

After leaving the packaging device 140, the now completed product units 109 are fed via an intermediate conveying device 102 formed as a gripper conveyor, to the stack forming device 101 and transferred to the associated feed device 121. A control and sorting-away device 103, at which the product units 109 conveyed past are examined e.g. with regard to their correct position and alignment in the gripper and discharged at the case may be, is provided between the packaging device 140 and the stack forming device 101 in the region of the intermediate conveying device 102.

For insertion into an envelope 213, collections 214 of products are composed, in the collating device 204 in the embodiment of a processing installation which is represented in FIG. 7.

The processing installation 200 comprises an addressing unit 242 which is arranged subsequently to the positioning device 250. The product units 209 are provided in the addressing unit 242 with an address which e.g. via suitable writing means is deposited directly onto an outer-lying product or which, deposited on a separate cover sheet or label, is fed to the product unit 209.

The processing installation 200 moreover comprises a device 260 for singularising and feeding envelopes 213 to an intermediate conveying device 202 designed as a gripper conveyor. The envelopes for this can be partly or completely creased or folded together.

The envelopes 213 which can be present in a size format which is larger, equal or smaller than the size format of the collections 214, are fed to an insert device 230 as is disclosed for example in WO 2009/143645 and are opened in this device for receiving collections 214. The grippers of the gripper conveyor 202 which revolve in the insert device 230 are opened for this, wherein the opened envelopes 213 which continue to be carried along in the grippers are held or carried along by way of support and holding means of the insert device 230.

After the insertion of the collections 214 into the envelopes 213, the grippers are closed again and the now completed product units 209 are conveyed away by way of the gripper conveyor 202.

For insertion into the envelopes subsequently to the addressing unit 242, the collections 214 are fed in a row one after the other and distanced to one another via suitable conveying means to the insert device 230, where these collections are inserted into the opened envelopes 213. The addressing of the collections can however also be effected after the insertion. The addressing unit in this case is arranged subsequently to the insert device (not shown).

After leaving the insert device 230, the product units 209 are fed by way of the gripper conveyor 202 to the stack forming device 201 and are transferred to the associated feed device 221. The empty grippers of the intermediate conveying device 202 after the transfer of the product units 209 to the feed device 221 are led back to the singularisation and feed device 260 for the purpose of a renewed receipt of envelopes 213.

A control and sorting-away device 203, at which the product units 209 led past are e.g. examined e.g. with regard to their correct position and alignment in the gripper and are sorted away as the case may, is provided between the insert device 230 and the stack forming device 201, in the region of the intermediate conveying device 202.

In the embodiment of the processing installation 300 which is represented in FIG. 8, collections 314 of products are put together in the collating device 304, for insertion into a main product such as newspaper.

The processing installation 300 for this comprises a device 360 for providing and transferring a main product 313 to a gripper conveyor 361. The main products 313 are fed to a drum-like insert device 330 as is disclosed for example in CH 690 576 and CH 689 864, and are transferred to the insert device 330 and opened, for the insertion of the collections 214 into this.

Further product parts (optionally) e.g. bundled newspapers can be fed to the insert device 330 via a further gripper conveyor 371 and inserted into the main product 313.

The collections 314, for insertion into the main product 313 subsequently to the positioning device 350 are fed via suitable conveying means in series one after the other and distanced to one another, to the insert device 330 where they are inserted into the opened main products 313. The main products 313 with the inserted collections 314 now form the completed product units 309. One also speaks of end products in this case.

After leaving the insert device 330, the product units 309 are fed to the stack forming device 301 by way of an intermediate conveying device 302 designed as a gripper conveyor, and transferred to the feed device belonging to this.

A control and sorting-away device 303, at which the product units 309 led past are e.g. examined with regard e.g. to their correct position and alignment in the gripper and are sorted away as the case may, here is also provided between the insert device 330 and the stack forming device 301, in the region of the intermediate conveying device 302.

The control and sorting-away device 103, 203, 303 according to the previously mentioned embodiment examples or a further control and sorting-away device in the mentioned embodiment examples can also be designed to examine other product parameters and to sort away the product unit from case to case. Further product parameters can e.g. be such as whether an additional product is inserted correctly into a main product or is correctly glued.

The error examination can be effected via sensors which operate according to an opto-electric method, e.g. by way of laser beams, or via a photo-optic method.

The processing installations 101, 201, 301 according to the described embodiments according to FIGS. 6 and 8 each have an installation control 210, 220, 320, via which the individual processing devices and processing units or their control units can be activated via communication leads 211. The activation can be effected centrally via the installation control 210, 220, 320 or decentrally via local control devices (not shown) in the individual processing devices, wherein the local control devices obtain control signals or control-relevant data, e.g. from the installation control.

With a format change, in particular with a change of the size format or area format, under certain circumstances resettings of component arrangements are necessary in:

a side aligning unit 112, 212, 312, in which the position of the side aligning elements which is defined by the width of the collections must be set (FIGS. 6, 7 and 8);

a positioning device 150, 250, 350, in which the position of the aligning cams which is defined by the length of the collections must be set (FIGS. 6, 7 and 8);

a film feed unit 143 of the packaging device 140, in which the turning-over procedure defined by the width and height of the collections 114 and for turning over the packaging material web must be set (FIG. 7);

a transverse welding unit 141, in which the position of the longitudinal connection defined by the width of the product units, as well as the distances and position of the transverse connections and of the separation locations which are defined by the length of the collections 114, must be set (FIG. 7);

a control and sorting-away device 103, 203, 303, in which the sensor setting dependent on the width and the length of the product units 109, 209, 309 must be changed (FIGS. 6, 7 and 8);

a stack forming device 14, in which e.g. the distance D1 of the side guides as well as the distance D2 of the support units must be changed (FIGS. 1, 6, 7 and 8);

a conveying-away device, in which the distance between the bound stacks must be retained despite changing size format of the stacks.

The mentioned list is only by way of example and should be conspired independently of the embodiment examples disclosed in the figures. Further devices in the processing installation such as binding station can likewise be subjected to a format resetting.

The invention claimed is:

1. An installation comprising a stacking device comprising:
    a stacking shaft that forms a stacking region;
    at least one support unit for manufacturing compositions of product units, in the form of stacks, wherein the at least one support unit forms a support surface on which a stack can be formed, and wherein the at least one support unit comprises at least two support elements, said at least two support elements being arranged next to one another or in an overlapping manner,
    at least one adjustor that sets a distance between lateral outer edges of the at least one support unit to changed size formats of product units, which are fed successively to the stacking device with a continued conveying operation;

wherein the at least one support unit can be led along a common closed circulatory path of a circulatory arrangement, and by way of this the at least one support unit can be moved in and out of the stacking region, wherein the at least two support elements of the at least one support unit are fastened on a transverse guide element in a rotationally secured manner, and are axially displaceable along the transverse guide element via positioning elements assigned to the support elements for setting a distance between lateral outer edges of the at least one support unit, wherein the transverse guide element is driven along the circulatory path of the circulatory arrangement.

2. The installation according to claim 1, wherein the stacking device comprises a side limiter with a first and a second stack limiter, and the adjustor sets a distance between the first and second stack limiters.

3. The installation according to claim 1, wherein the stacking shaft comprises a main stacking shaft that forms a main stack and a preliminary stacking shaft arranged above the main stacking shaft for that forms a preliminary stack, wherein the at least one support unit can be moved into and out of the preliminary stacking shaft.

4. The installation according to claim 1, wherein the device comprises a feed device that feeds product units to be stacked into the stacking region.

5. The installation according to claim 1, wherein at least one support element of the at least one support unit, along its circulatory path, is operatively connected in each case to a positioning element such that the lateral position of the support element can be set via the positioning element, wherein the position of the positioning element can be adjusted transversely to the circulatory path of the support unit via the adjustment arrangement.

6. The installation according to claim 5, wherein the positioning element comprises a circulatory guide member that acts as a lateral limitation for a guide element arranged on the support unit and cooperating with the support element.

7. The installation according to claim 1, wherein the at least one support unit is driven via a conveying element and moved along a circulating path of the conveying element.

8. The installation according to claim 7, wherein the conveying element is a chain or a toothed belt.

9. A method for operating an installation comprising the steps of:

providing an installation for manufacturing compositions of product units according to claim 1 in which product units with different size formats are processed, the installation further including a conveying device for conveying the product units in the installation, the installation further including a controller that controls the installation, effecting the change of the distance between the lateral outer edges of the at least one support unit and adapting this distance to the changed size format of a subsequent product unit via the adjustor with a continued conveying operation, and controlling the adjustor with the controller such that the change of the distance between the lateral outer edges of the at least one support unit is effected in a time period directly after running of a last product unit with a first size format and directly before running of a subsequent first product unit with second size format, through the at least one support unit of the stacking device.

10. The method according to claim 9, wherein the first product unit of a subsequent product stream, in comparison to the product distance within said subsequent product stream and in comparison to the product distance within the preceding product stream, forms a larger distance to the preceding last product unit of the preceding product stream with other size format.

11. The method according to claim 9, wherein the effecting the change of the distance between the lateral outer edges of the at least one support unit occurs with continued and gapless conveying operation.

12. The method according to claim 9, wherein with a change of the size format of the product units to be stacked, via the controller, a distance between a first and a second lateral stack limiter is changed via the adjustor and is adapted to the changed size format of the subsequent product units.

13. The method according to claim 9, wherein the information with regard to the size formats of the product units to be processed or their products, is transmitted to the controller before the setting of the distance.

14. The method according to claim 9, wherein the products or product units, at least in regions, are conveyed through the processing installation in a cycled manner, and a central controller assigns to each cycle a data package which is led in a likewise cycled manner through the processing installation to a controller of the stacking device, to the individually cycles, and the data package contains control data or information which is based on size formats, and the controller uses the control data or information of the data package to set the distance between the lateral outer edges of the at least one support unit to the changed size formats.

15. The method according to claim 9, wherein during the setting of the distance between the lateral outer edges of the at least one support unit to the changed size formats of the product units, the conveying speed is reduced with respect to a nominal speed.

* * * * *